United States Patent [19]

Takama et al.

[11] Patent Number: 5,572,518
[45] Date of Patent: Nov. 5, 1996

[54] BAND MANAGEMENT SYSTEM IN COMMUNICATION

[75] Inventors: Maki Takama; Tetsuo Tachibana; Emi Hata, all of Kawasaki, Japan

[73] Assignee: Fujitsu Limited, Kawasaki, Japan

[21] Appl. No.: 432,258

[22] Filed: May 1, 1995

Related U.S. Application Data

[63] Continuation of Ser. No. 909,019, Jul. 6, 1992, abandoned.

[30] Foreign Application Priority Data

Jul. 5, 1991 [JP] Japan .................................. 3-165366

[51] Int. Cl.$^6$ ...................................................... H04J 3/12
[52] U.S. Cl. ........................ 370/58.1; 370/60.1; 370/68.1
[58] Field of Search ................................. 370/79, 17, 32, 370/85.7, 95.1, 94.1, 110.1, 85.1, 58.2, 60, 85.4, 63, 86; 375/327; 340/825.8

[56] References Cited

U.S. PATENT DOCUMENTS

| | | | |
|---|---|---|---|
| 4,550,399 | 10/1985 | Caron | 370/84 |
| 4,704,716 | 11/1987 | Bowers et al. | 370/63 |
| 4,884,269 | 11/1989 | Duncanson et al. | 370/121 |
| 5,054,019 | 10/1991 | Mathis et al. | 370/121 |
| 5,153,877 | 10/1992 | Esaki et al. | 370/60 |
| 5,187,707 | 2/1993 | Chu et al. | 370/94.1 |
| 5,258,979 | 11/1993 | Oomuro et al. | 370/95.1 |

FOREIGN PATENT DOCUMENTS

| | | |
|---|---|---|
| 0 274 793 | 7/1988 | European Pat. Off. . |
| 0 411 674 | 2/1991 | European Pat. Off. . |
| 0 431 438 | 6/1991 | European Pat. Off. . |

*Primary Examiner*—Wellington Chin
*Assistant Examiner*—Huy D. Vu
*Attorney, Agent, or Firm*—Staas & Halsey

[57] ABSTRACT

The invention is to offer a technology with which a call process, a band setting process in particular, from a unit of terminal equipment to a network can be effectively performed, in relation to a communication system in which a communication band necessary for a unit of terminal equipment is secured by transmitting a SETUP message to a network from the terminal equipment as in the case of a call procedure in B-ISDN, etc. In the communication control of the terminal equipment connected to the network, when a call is made if the securing of a band in the network is impossible, the call is cut off, but if the band area in the network is insufficient for an initial band value stored in a SETUP message, a revised band value is produced by subtracting a certain value from the initial band value, and a SETUP message with the revised band value is retransmitted to the network.

17 Claims, 18 Drawing Sheets

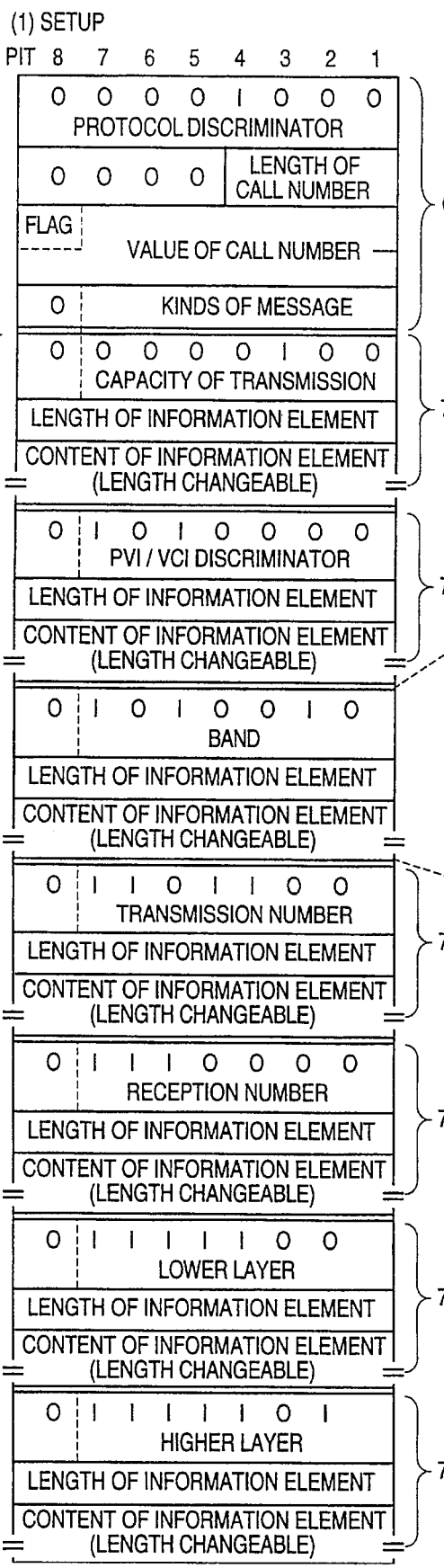
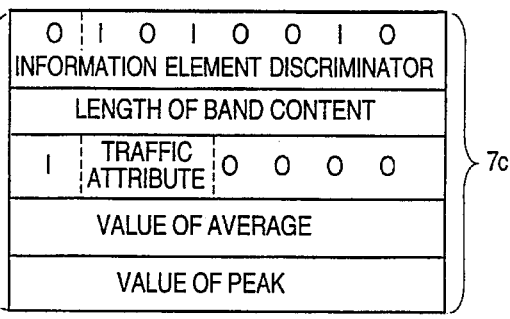
FIG. 4

| REASON INDICATION NUMBER # | CLASS | VALUE | REASON INDICATION | DIAGNOSTIC INFORMATION |
|---|---|---|---|---|
| 10 | 001 | 0001 | BAND AREA SETTING :IMPOSSIBLE | BAND |
| 11 | 001 | 0010 | BAND AREA :INSUFFICIENT | BAND |
| 12 | 001 | 0011 | TIME-OUT OF TIMER | TIMER NUMBER |

FIG.12

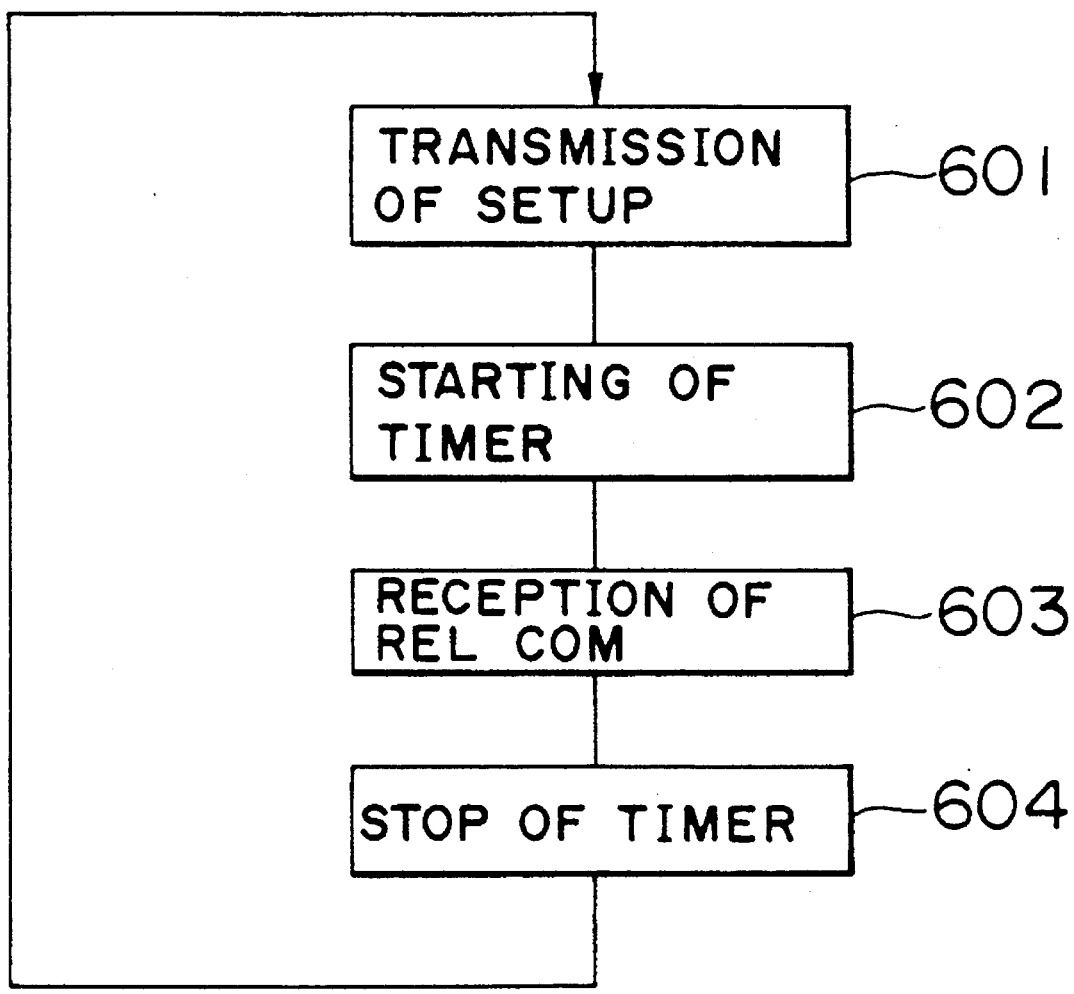
F I G. 13

BAND MANAGEMENT SYSTEM IN COMMUNICATION

This application is a continuation of application Ser. No. 07/909,019, filed Jul. 6, 1992, now abandoned.

BACKGROUND OF THE INVENTION

The present invention relates to an effective technology in being applied to a communication system in which a communication band necessary for a unit of terminal equipment can be secured by transmitting a call control message (SETUP message) to a network from the terminal equipment as in the case of a call procedure in B-ISDN, etc.

In the B-ISDN network, various terminal equipment is connected with one communication line through the Network Termination (NT). As for the kind of the terminal equipment, there are telephones, facsimiles, computer data terminals, video terminals, telex, etc. And it is possible to use some of these terminals at the same time.

In the B-ISDN Network, when the service is requested from the terminal, the communication starts after a network secures the communication band. For example, it is mentioned from column 3 line 47 to column 4 line 27 in U.S. Pat. No. 4,704,716 that a signal, i.e. SETUP message for requesting the width of the band is sent from a terminal, and then the network secures the adequate width of the band, and connects the communication line.

The width of the band to communicate depends on the kinds of the terminals. The terminal which contains much data requires the wide one, on the other hand, in the case of little data, it requires the narrow one.

When a SETUP message is transmitted to a network from a unit of terminal equipment, if a band setting in the network is found to be impossible according to the information element of the message, a call procedure has to be repeated. Because of this, it takes much time for the call process itself, so that it is felt a concern about the lowering off communication efficiency.

SUMMARY OF THE INVENTION

The above-mentioned problems are solved by the present invention. An object of the invention is to offer a technology which executes effectively a call process, a band setting process in particular, to a network from a unit of terminal equipment.

In a communication technology such as in B-ISDN, when terminal equipment intends to execute a transmission of data, at first it transmits a SETUP message to a network. At the same time it declares a necessary band for itself for the network. After a certain band is secured in the network, the communication line is connected. The terminal equipment transmits data in a unit which is called a packet (cell).

A band is expressed by the number of cells being able to be transmitted a second. When a band value is, for example, 100, it means that a hundred cells can be transmitted a second.

In the present invention, telecommunication system has terminal equipment. This terminal equipment is connected to a communication network.

The terminal equipment has a call means. The call means transmits a SETUP message to the network. The SETUP message is storing an initial band value $B1$ to be used by the terminal equipment.

The SETUP message is received by the network, for example, a switching system installed in the network. A band comparing means compares the initial band value $B1$ of the terminal equipment and a band value $B2$ of available band area of the network.

The result of comparison are these three types as follows:

$B1 \leq B2$ :transmission possible: band is vacant $B2=0$ :transmission impossible: no usable band $B1>B2>0$ :transmission impossible: lack of usable band In the case of $B1<B2$, a response means transmits a call control message for a call setting to the terminal equipment. When the call is set, a communication line is connected. Then communication is possible.

In the ease of $B2=0$, the response means transmits a call control message indicating no usable band to the terminal equipment. A communication control means cuts off the call, when the terminal equipment receives the call control message indicating no usable band.

In the case of $B1>B2>0$, the response means transmits a call control message indicating lack of usable band to the terminal equipment. When the terminal equipment receives the call control message indicating lack of usable band, the communication control means calculates a revised band value $B3$ which is less than the band value $B2$. The revised band value $B3$ is stored in a SETUP message and transmitted to the network by the call means.

The revised band value $B3$ may be obtained preferably by subtracting a specified value from the initial band value $B1$.

There is another way to obtain the revised band value $B3$ as follows.

An insufficient band value calculating means may obtain an insufficient band value $B4$ by subtracting the band value $B2$ from the initial band value $B1$. The communication control means obtains the revised band value $B3$ by subtracting the insufficient band value $B4$ and upward from the initial band value $B1$.

The response means may transmit the band value $B2$ of the network to the terminal equipment in the case of $B1>B2>0$. Then the communication control means obtains the revised band value $B3$ by subtracting a specified value from the band value $B2$.

According to the present invention as described in the above, even when a call from the terminal equipment is rejected, according to the condition of the network, the probability of setting a call can be improved by recalling with a reduced band value. Therefore, in B-ISDN line, etc., a call process, a band setting process in particular, from the terminal equipment to the network can be effectively performed.

When the revised band value $B3$ is obtained by subtracting a specified value from the initial band value $B1$, it depends on the circumstances of respective units of terminal equipment or the kinds of data to be transmitted (image data, audio data or character data) to what extent the band value can be reduced. In the case of audio data or character data, for example, in most cases there is no problem for grasping the meaning of information even though a band value is reduced, but in the case of image data, there can be a probability that a value as image information may be lost by the degradation of image quality.

As mentioned in the above, when a band value cannot be reduced, there can be a remedy for such a case to provide a timer and retransmit a SETUP message with an initial band value at the time of time-out.

The band value needed by the terminal equipment, that is, the initial band value $B1$ is predetermined in general corresponding to each terminal equipment. Volume of the band value depends on the kinds of data to be transmitted or amount of data. For example, if the terminal equipment is a telephone, the band value is 20 because the amount of data is small. If the terminal equipment is a facsimile, the band value is 100 because the amount of data is large.

On the other hand, a band value setting means may be installed in the terminal equipment. It sets a band value to use corresponding to data to be transmitted.

BRIEF DESCRIPTION OF THE DRAWINGS

FIG. 4 is an illustrative representation showing the data constitution of a SETUP message to be transmitted in the present invention;

FIG. 12 is an illustrative representation showing a reason indication parameter added to a call control message from the network in the present invention;

FIG. 13 is a flow chart showing the process procedure in the terminal equipment in the embodiment 2;

DETAILED DESCRIPTION OF THE PREFERRED EMBODIMENTS OF THE INVENTION

The invention is more fully understood from the following detailed description when read with reference to FIGS. 1 to 19.

Embodiment 1

Figure 1:
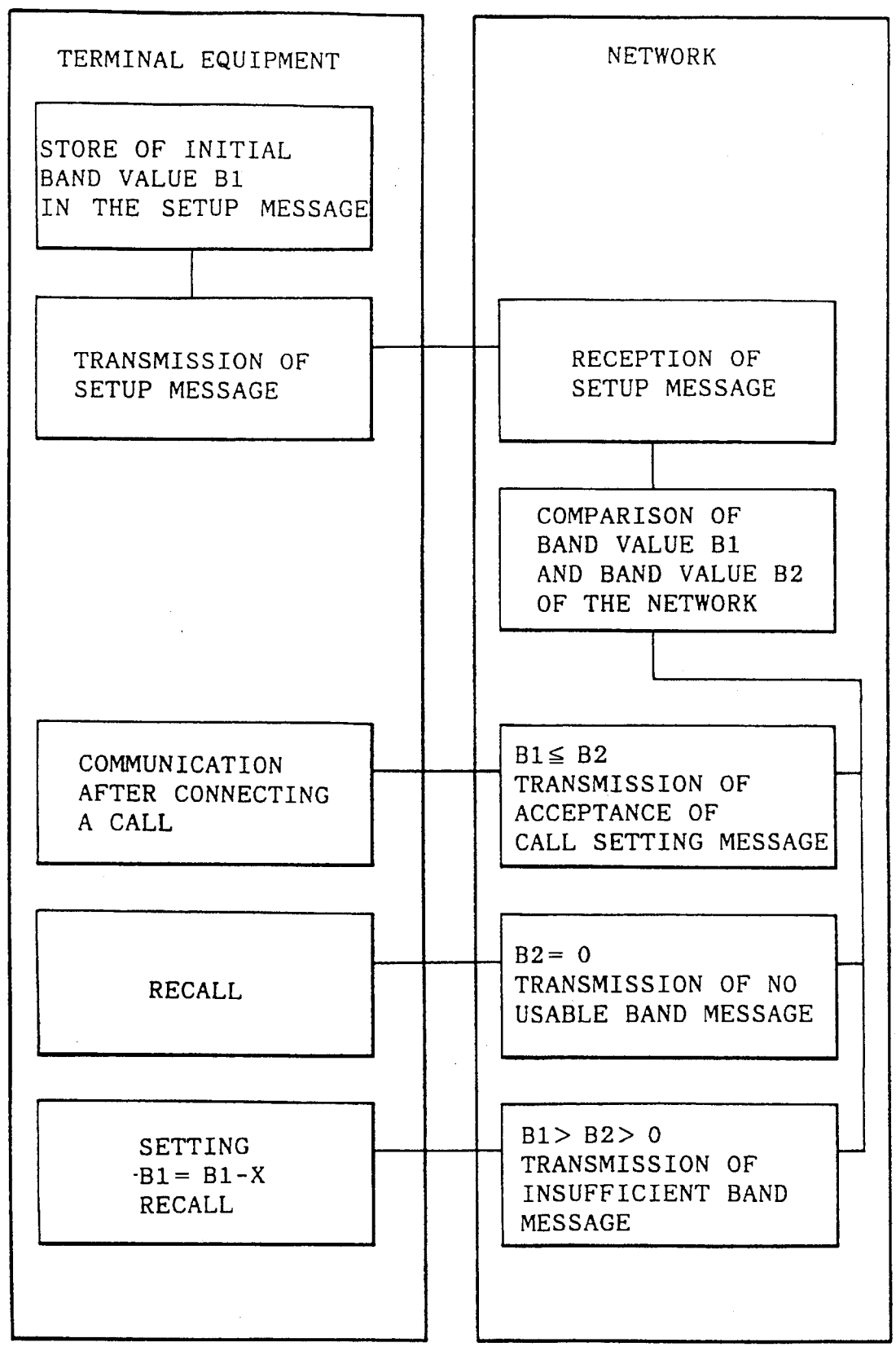
FIG. 1 is a chart explaining the principle of the present invention.
Figure 2:
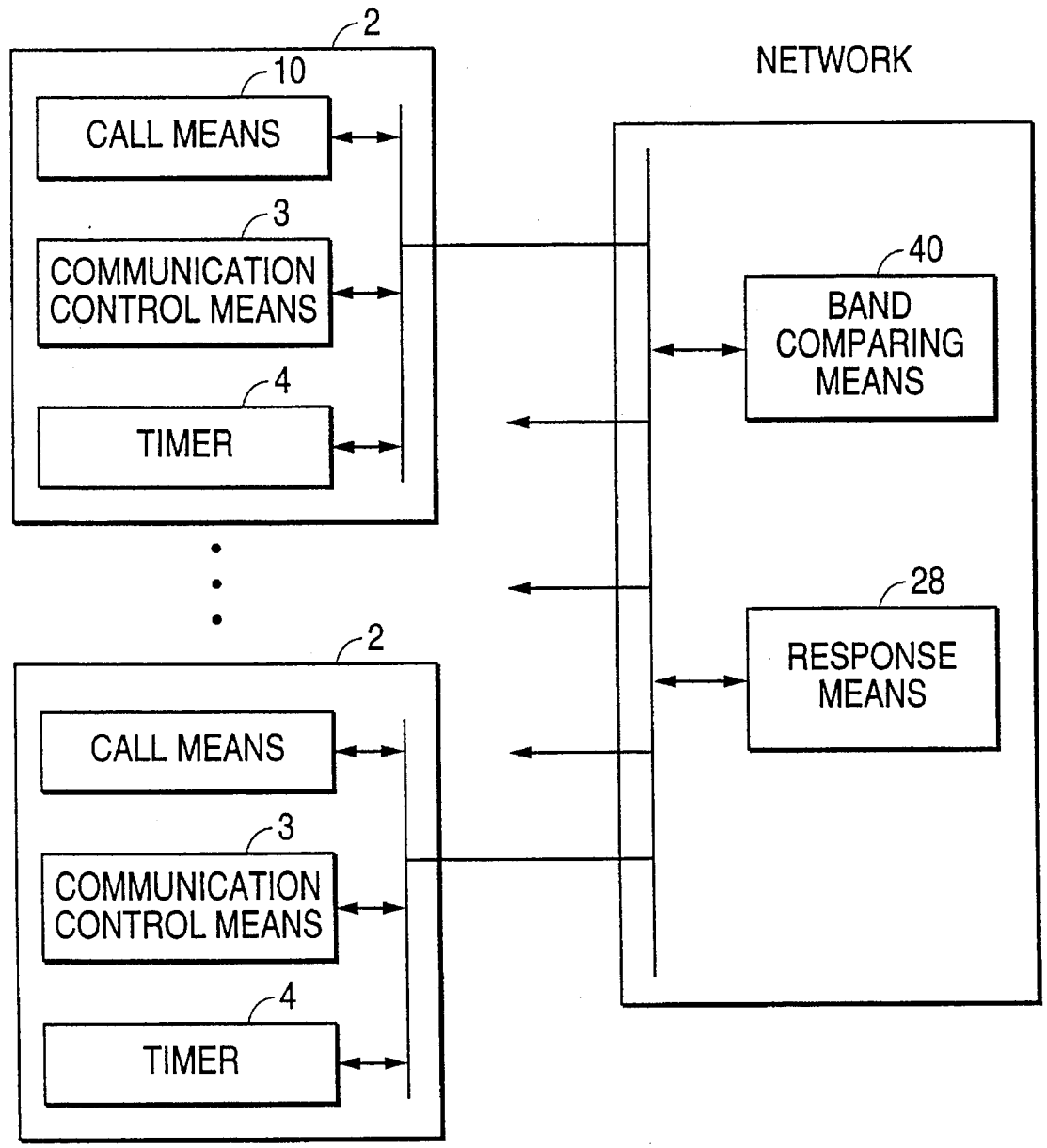
FIG. 2 is a block diagram showing the system constitution of the present invention.
Figure 3:
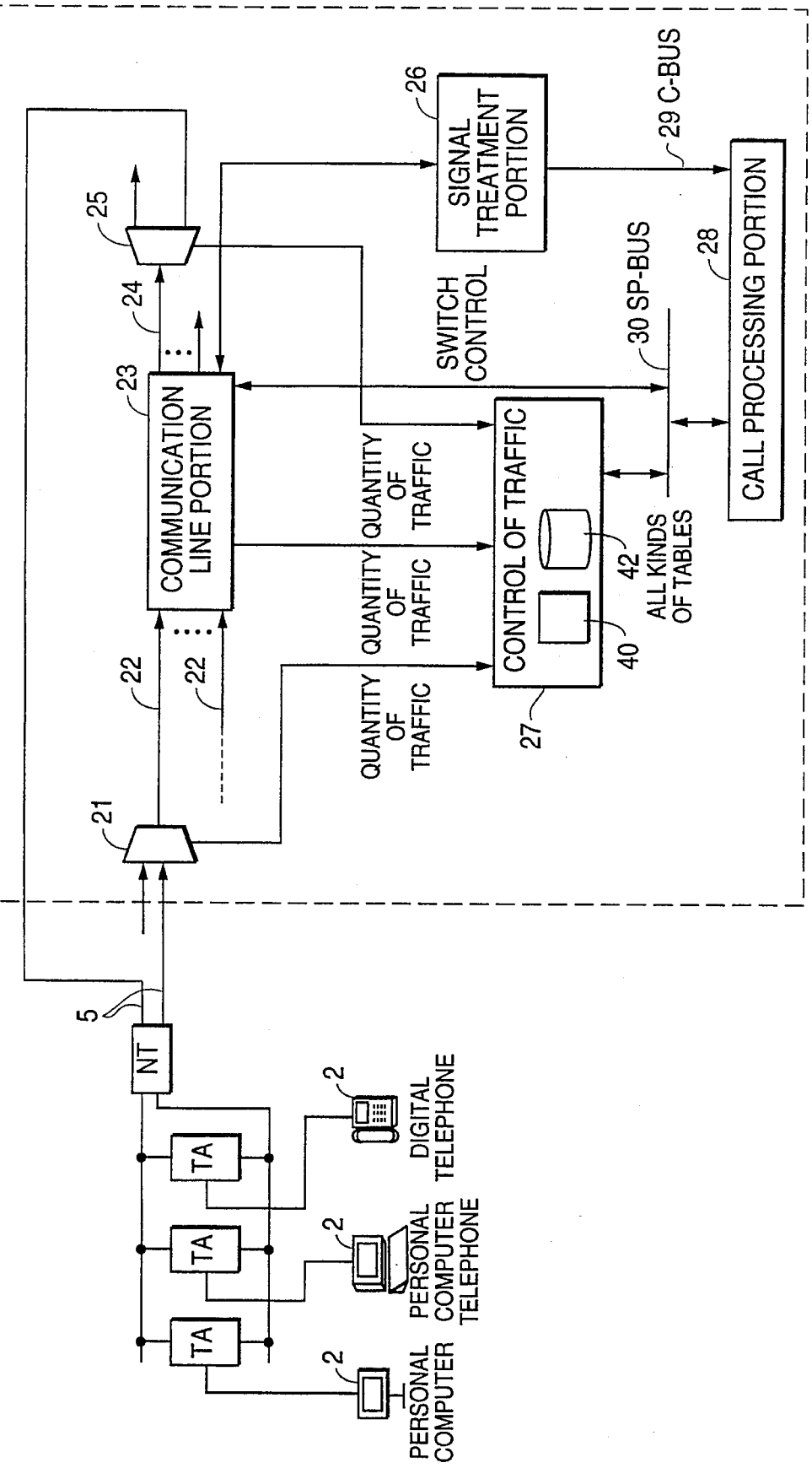
FIG. 3 is a block diagram showing the system constitution of the embodiment 1.

FIG. 1 is a principle illustrative representation of the present invention and FIG. 2 is a block diagram showing the constitution of the present invention. FIG. 3 shows an ATM switching system that is materialized under these principle illustrative representations. In FIG. 3, reference numeral 2 means a terminal equipment, TA means a terminal adapter, NT means a Network Termination which forms the user network interface, 21 means a multiplexer, 22 means an input transmitting line, 23 means a communication line portion, 24 means an output transmitting line, 25 means a distributing circuit, 26 means a signal treatment portion, 27 means a traffic control portion, 28 means a call processing portion, 29 means a C-BUS for controlling signal, and 30 means a SP-BUS for controlling a communication line.

Under this configuration, the amount of traffic is input to the traffic control portion 27, from the input transmitting line 22, the output transmitting line 24, and link of the communication line portion 23, therefore, band value B2 in use is kept.

Reference numerals 21 to 30 are showing a side of the network 1, and this network 1 is connected to the terminal equipments 2 through a communication line 5. A call means 10 and a communication control section 3 are provided in the terminal equipment 2. The communication control section 3 executes the control of the transmission or reception of message or data to or from the communication line 5.

Under these communication system, when a call is made from the call means 10 of the terminal equipment 2, the expected band used by the terminal, e.g. 10 Kbps or 10 Mbps, and the service class corresponding to the band, e.g. the determined mark such as a, b, c, etc., are added to the SETUP message and transmitted to the network 1.

Figure 9:
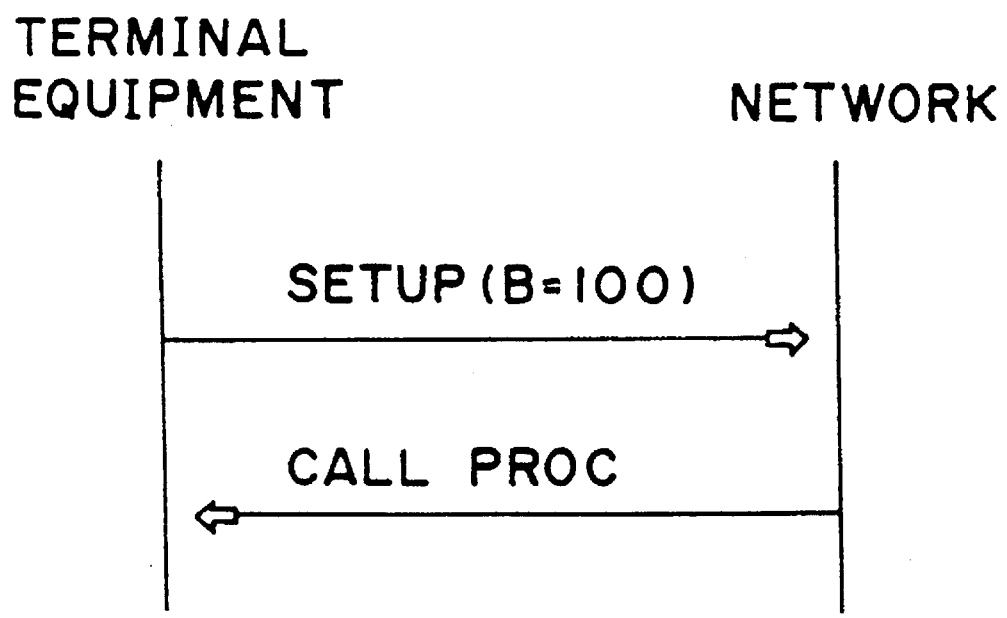
FIG. 9 is a sequence chart showing the process in the case of B1<B2 in the embodiment 1.

FIG. 9 shows the format of a SETUP message to be transmitted from the terminal equipment 2. In the present embodiment, the protocol conforms to the layer 3 of OSI, and the SETUP message shown in FIG. 9 also conforms to it.

The message format in the present embodiment is composed of a common section 6 and seven individual sections 7's (7a to 7g) having the constitution of 32 bits. The common section 6 is a place for directly registerring messages, etc., and information elements are registered in the individual sections 7's.

The information elements are, for example, (1) the attributes of a communication channel such as an exchange mode, an information transfer ability and an information transfer speed, (2) what channel (B1, B2 or D) is to be used for a call, (3) the number of an object subscriber and (4) the kind of services such as telephone communication, facsimile transmission, etc.. These are registered in each individual section 7a to 7g respectively. The length of band contents, traffic information, average value of the band and peak value of the band are registered in the third individual section 7c.

A SETUP message itself is expressed by a binary coded message type, and the SETUP message (00000101, for example) is registered in the common section 6.

Figure 5:
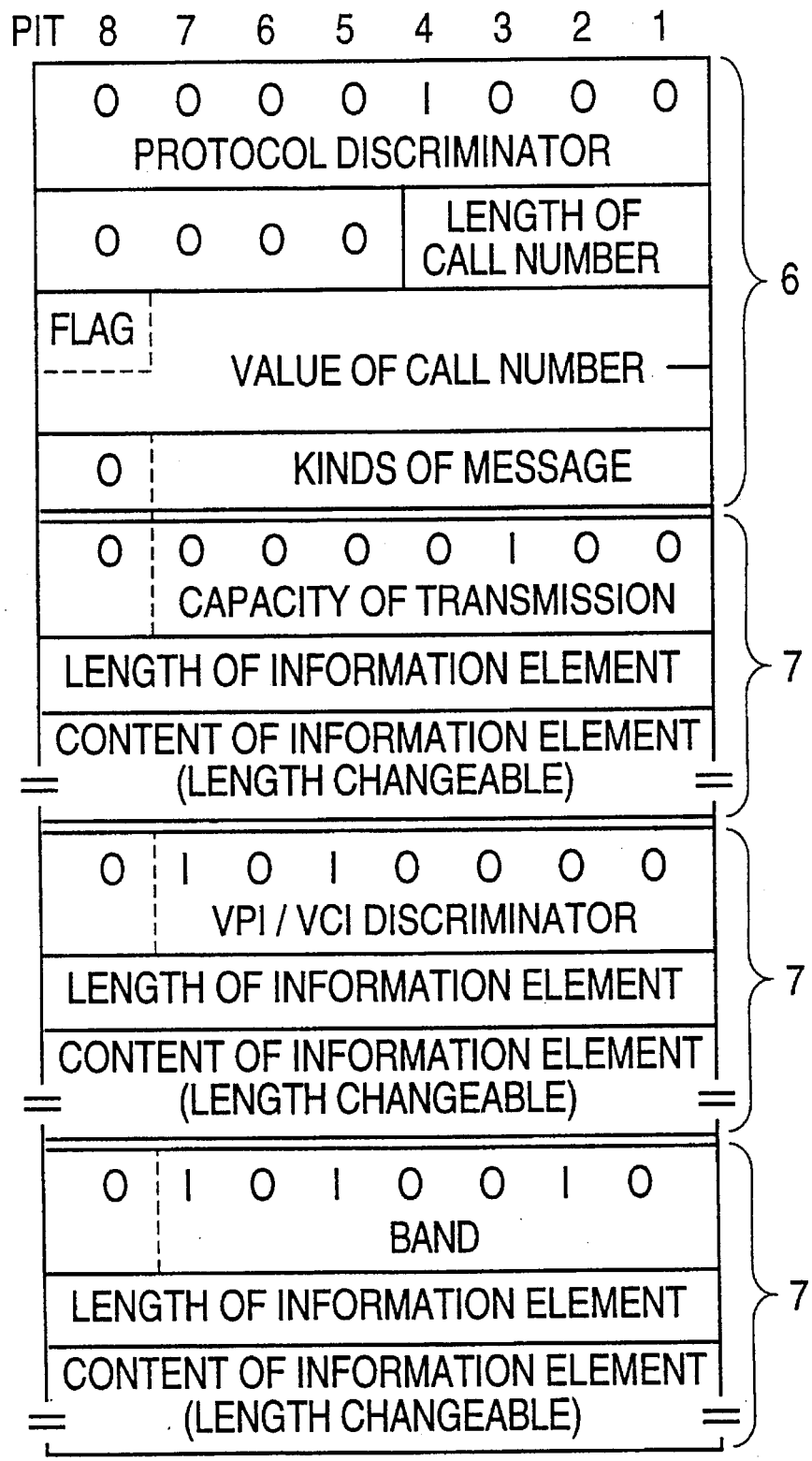
FIG. 5 is an illustrative representation showing the data constitution of a call control message to be transmitted in the present invention.

A call control message returned from the network 1 for the SETUP message transmitted from the terminal equipment 2 has also a similar constitution as shown in FIG. 5, and the condition of the network 1 can be recognized by analyzing the message type registered in the common section 6.

Next, the control method in the communication control section of the terminal equipment 2 in the present embodiment will be explained using FIG. 6 to FIG. 11.

When a call is made from the terminal equipment 2, the communication control section 3 produces a SETUP message (SETUP) as shown in FIG. 4. At this time, a message type, 00000101, of a SETUP message (SETUP) is registered in the common section 6, and a band value, B=100 for example as a peak value, is registered in the third individual section 7c as an information element (step 301) for transmitting the SETUP message (SETUP) to the network 1 (302).

Once this SETUP message is detected by the switching system, it is input to the signal treatment portion 26 by way of the communication line portion 23. Then, the SETUP message inputted to the signal treatment portion 26 is input to the traffic control portion 27 and call processing portion 28. And the early band B1 is transmitted to the band comparing means 40 in the traffic control portion 27.

In the call processing portion 28, when it receives the SETUP message, it discriminates between the input transmitting line 22 and the output transmitting line 24, based on the sending terminal information, and call and receiver's address information, and inquires to the traffic control whether the transmitting lines are occupied or not through these sending information.

In the traffic control portion 27, the using condition for the input transmitting line 22 and the output transmitting line 24, e.g. band information is informed from the traffic keeper and is kept on the table 42. To the inquiry from the call processing portion 28, the band comparing means 40 of the traffic control portion 27 compares the band B2 in the network to the band B1 reported by the terminal, and judges whether it is possible or not to transmit to the reported band B1.

The result of comparison are these three types as follows:

| | |
|---|---|
| B1 ≦ 2 | "11"(transmission possible: band is vacant) |
| B2 = 0 | "00"(transmission impossible: no usable band) |
| B1 > B2 > 0 | "10"(transmission impossible: lack of usable band) |

Once the call processing portion 28 receives "11" from the traffic control portion 27, it inquires the conditions of the call link which connects with the input transmitting line 22 and output transmitting line 24 to the traffic control portion 27. Traffic control portion 27 selects the link which enables to be sent the reported band B1, judges whether or not there is a rout to connect among some switches, e.g. the first link and the second link, and send to an information, which shows possibility of transmission, to the call processing portion 28.

Once the call processing portion 28 receives this information, it selects a pass, and supplies a connect control information to form the pass to the communication line portion 23. Under this procedure, the line is connected. Accordingly, the terminal equipment 2 and object terminal equipment is connected.

Next, a call control message from the network 1 (object terminal equipment) for the SETUP message (SETUP) is received (303). If the call control message from the network is CALL PROC (CALL PROCeeding) as shown in FIG. 9, that is, an acceptance notice for a call setting, the process is transferred to a call setting acceptance process in step 307 through steps, 303, 304 and 306.

The call setting acceptance process will be explained briefly in the following.

When a CALL PROC message from the network 1 (the object terminal equipment)is received, following to this, ALERT (ALERTing), which shows that the object terminal equipment is transmitting a message for call a receiver, is received in the terminal equipment 2, and when the receiver makes a response, CONN (CONNect) is notified; thus the channel, B, is connected to both the transmitter and the receiver, and telephone conversation or telephone communication is started.

Figure 10:
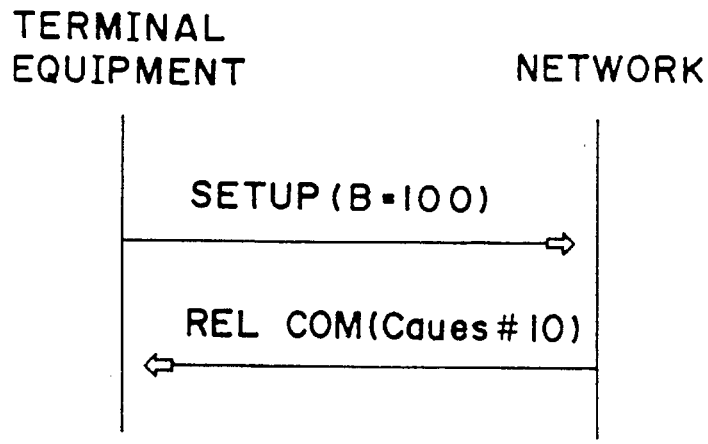
FIG. 10 is a sequence chart showing the process in the case of B2=0 in the embodiment 1.
Figure 11:
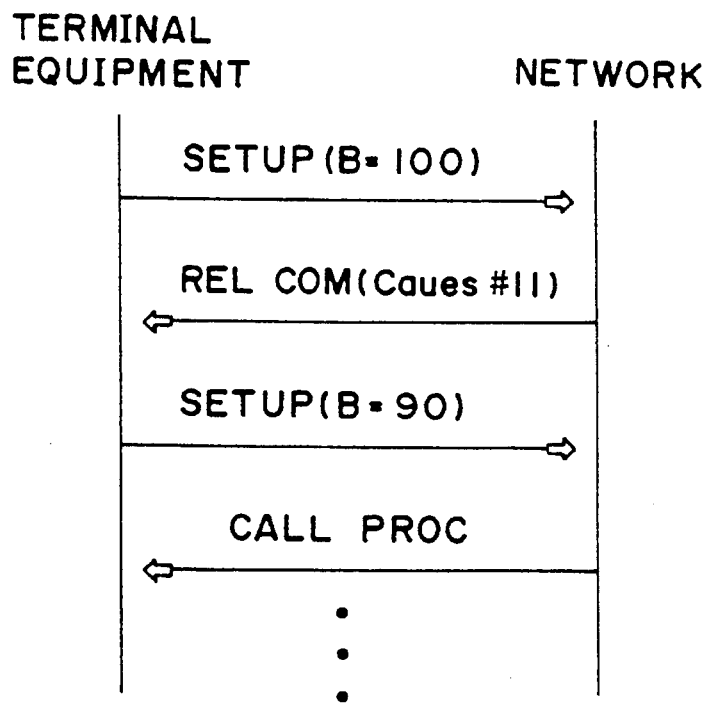
FIG. 11 is a sequence chart showing the process in the case of B1>B2>0 in the embodiment 1.

When the call processing portion 28 receives "00" or "10" as a result of comparison from traffic control portion 27, as shown in FIGS. 10 and 11, the call processing portion 28 makes a call control message "REL COM" (RELease COMplete) and transmits the message to the terminal equipment 2. A reason indication parameter is registered in the information element of the message "REL COM". In the case that the result of comparison is "00", the reason indication parameter is "#10". In the case that the result of comparison is "10", the reason indication parameter is "#11".

Figure 6:
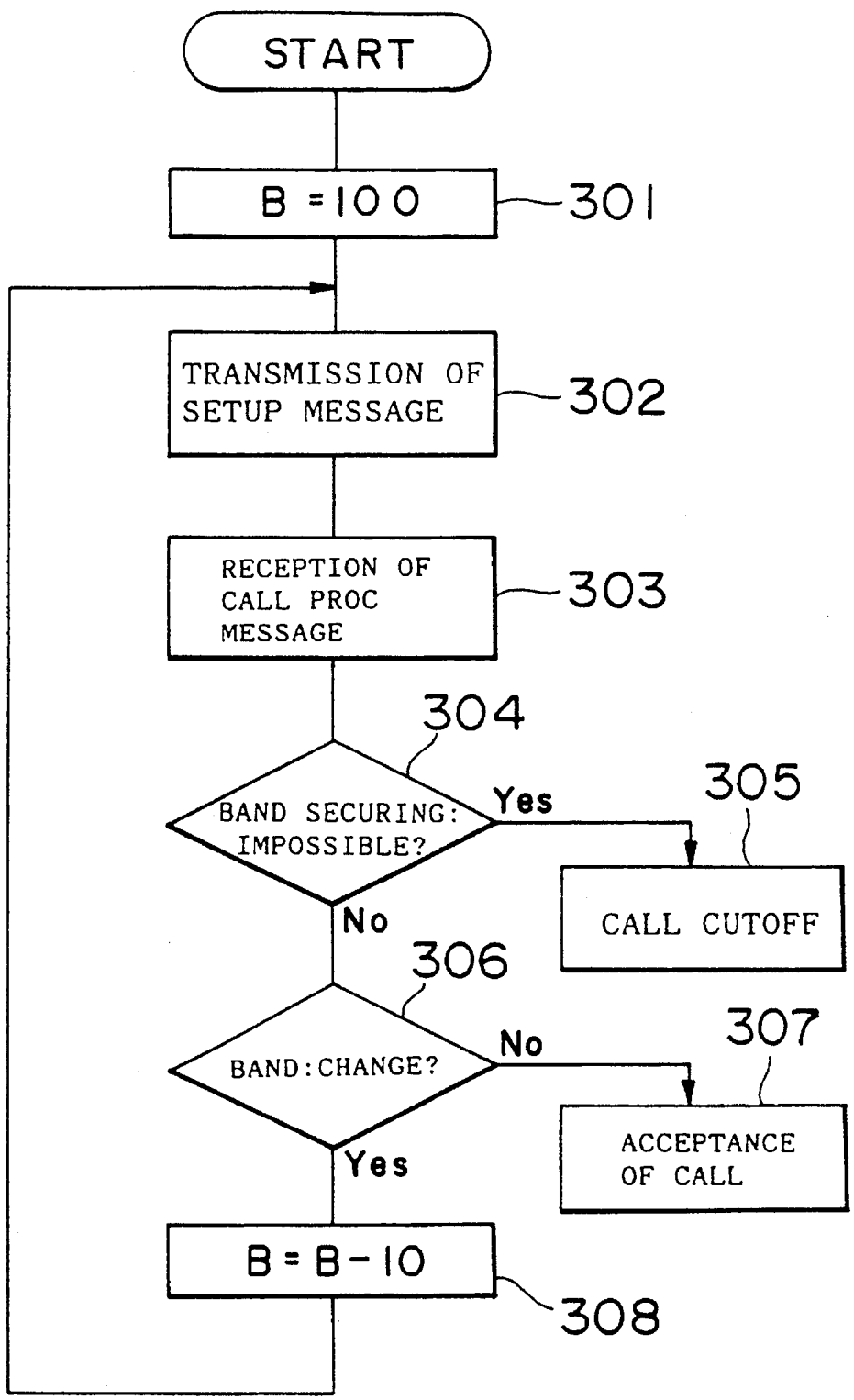
FIG. 6 is a flow chart showing the process procedure in the terminal equipment in the embodiment 1.
Figure 7:
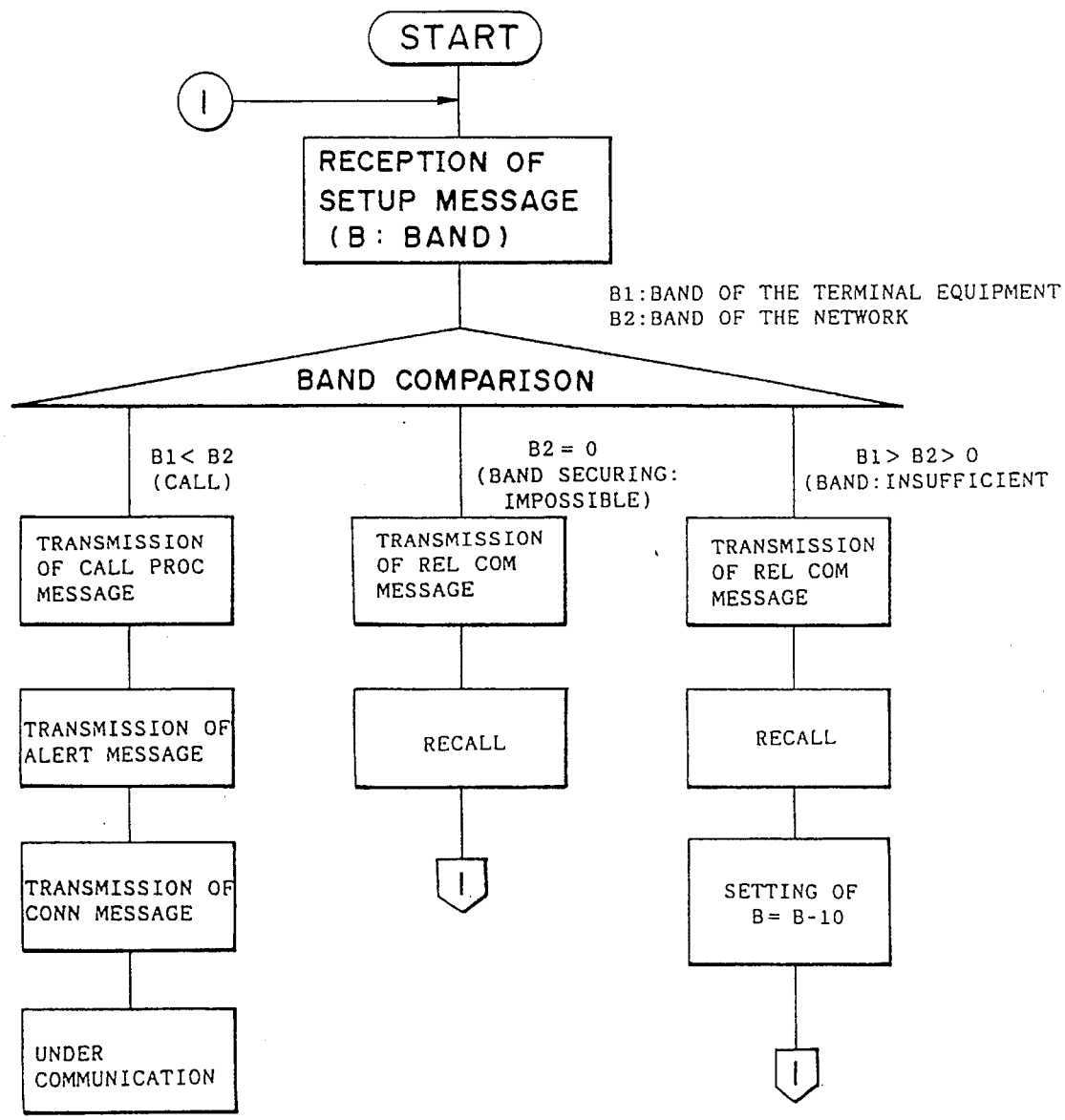
FIG. 7 is a flow chart showing the process procedure in the network in the embodiment 1.
Figure 8:
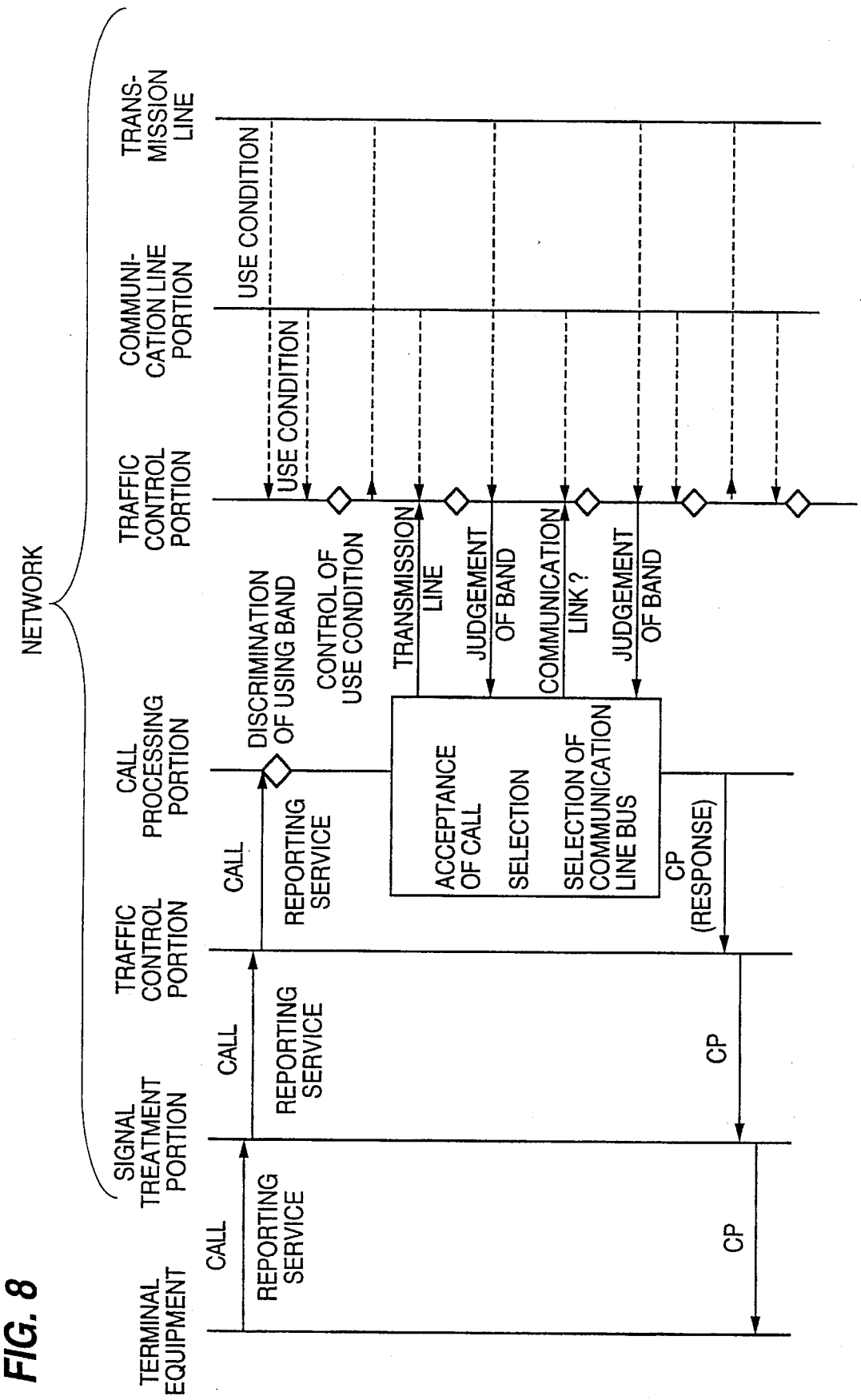
FIG. 8 is a sequence chart showing the process in the embodiment 1.

When the terminal equipment 2 receives a call control message "REL COM" from the network 1 for the SETUP message (SETUP), a process in step 304 and so on as shown in FIG. 6 are performed.

In other words, it is judged in the above-mentioned process if the REL COM is caused by either impossibility of securing a band (304) or insufficiency of a band in the network 1 (306).

The judgment can be made with a reason indication parameter registered in the information element of the message, REL COM, from the network 1. Number "#10" shows a case when a setting of a band area is impossible, and number "#11" shows a case when a band area is insufficient, for example. These relations are shown in FIG. 12.

When the communication is forbidden with the reception of REL COM, if it is caused by the impossibility of band setting, the call is cut off (305). The process sequence corresponding to this is shown in FIG. 10. When the call is cut off, the initial SETUP message (SETUP) can be retransmitted again after specified waiting time has been passed. This waiting time can be settled freely.

If the above-mentioned communication forbidding is caused by the insufficiency of a band (306), a revised band value (B3=90) obtained by subtracting a certain value (assumed to be 10) from the initial band value (B1=100) is re-registered and a SETUP message (SETUP) is retransmitted to the network 1 (302).

A process sequence in which communication is made possible by reducing a band value is shown in FIG. 11.

Embodiment 2

FIG. 13 shows a process procedure in another embodiment according to the present invention.

According to the present embodiment, after a SETUP message (SETUP) is transmitted in setting a band value (B1=100) (601), a timer 4 is started (602), and when a call control message from the network 1 is REL COM, the reason is analyzed (603). In this step, the timer 4 is stopped (604).

The timer 4 is a subtraction counter to which an initial value is loaded from a RAM, a ROM, etc., not shown in a drawing, at a reception of a start command, and the value is subtracted with the lapse of time, and when the value reaches 0, it outputs a time-out signal.

In a step of time-out (606), the transmission of a SETUP message is executed again (602).

Figure 14:
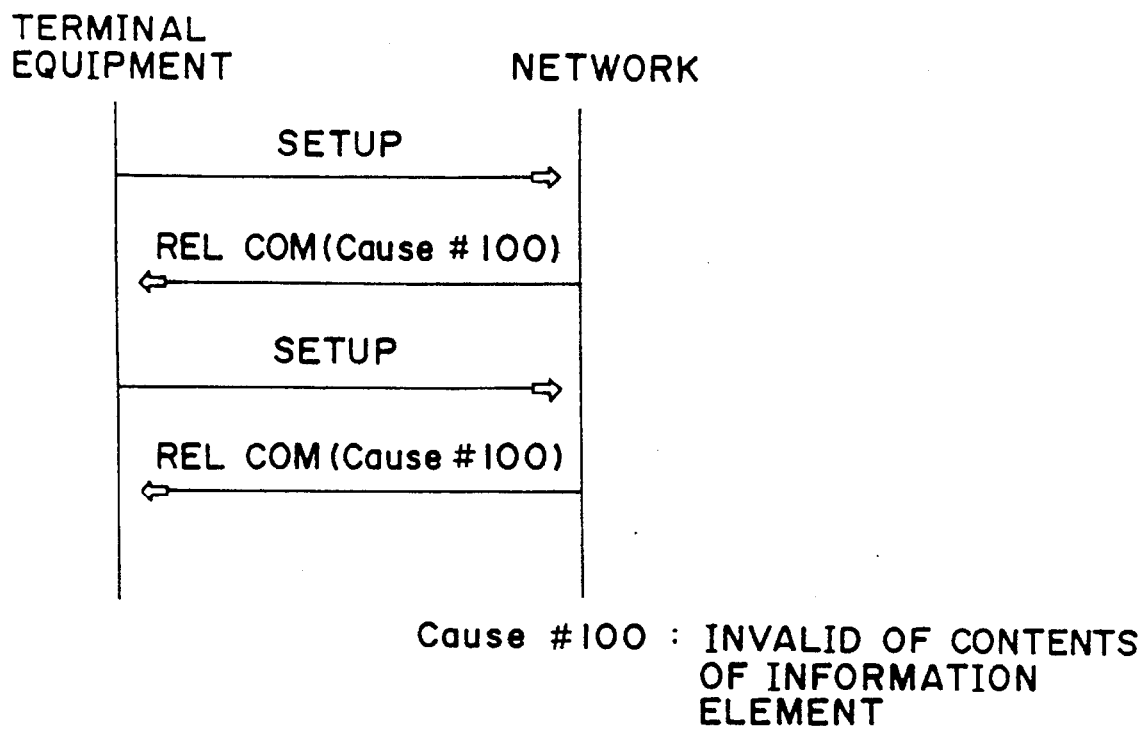
FIG. 14 is a sequence chart showing the process in the embodiment 2.

The process sequence is shown in FIG. 14.

As mentioned in the above, in the present embodiment, the transmission of a call can be repeated every lapse of time of a fixed period.

Figure 15:
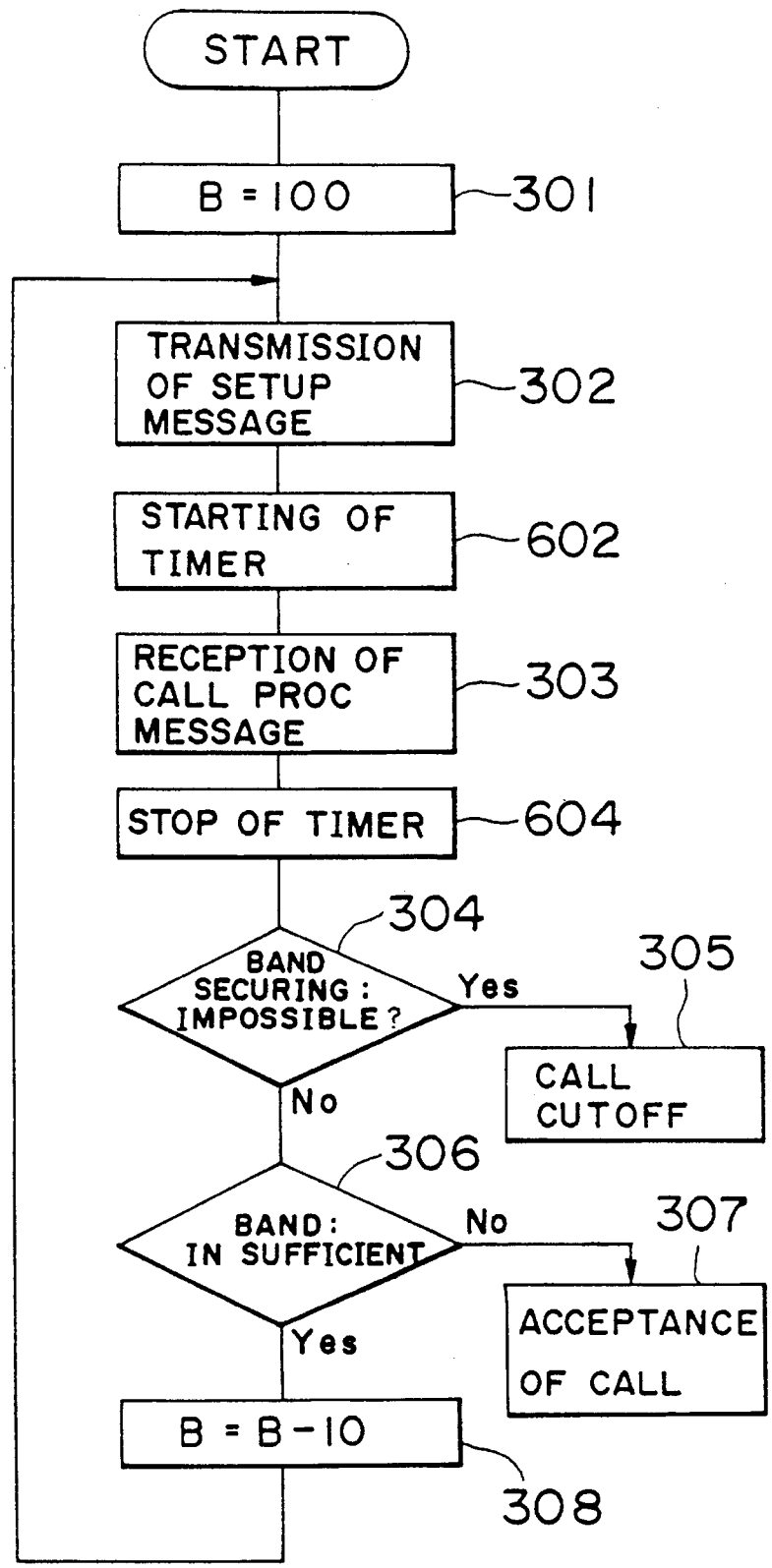
FIG. 15 is a flowchart showing the process procedure in the terminal equipment combined the embodiment 1 and 2.
Figure 16:
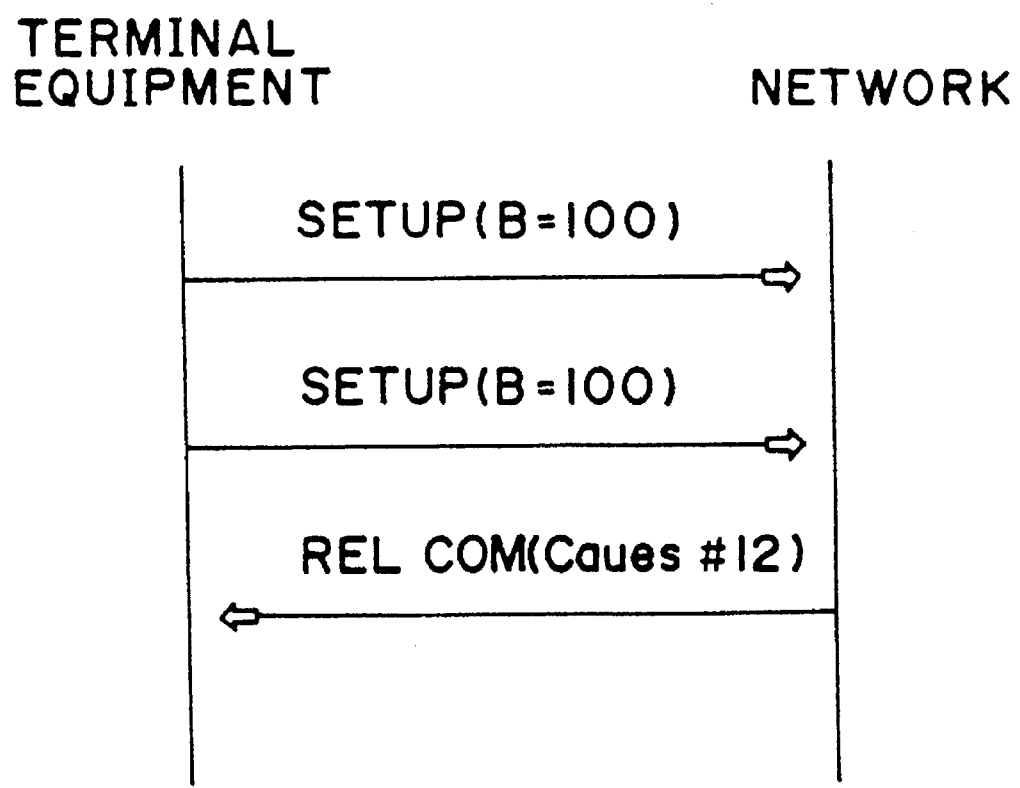
FIG. 16 is a sequence chart showing the process transmitting a call control message with a reason indication parameter in the case of time-out.

FIG. 15 shows a process combined this embodiment 2 and above embodiment 1. In the case of "time-out", the reason indication parameter added to the call control message is "#12" as shown in FIGS. 12 and 16.

Embodiment 3

Figure 17:
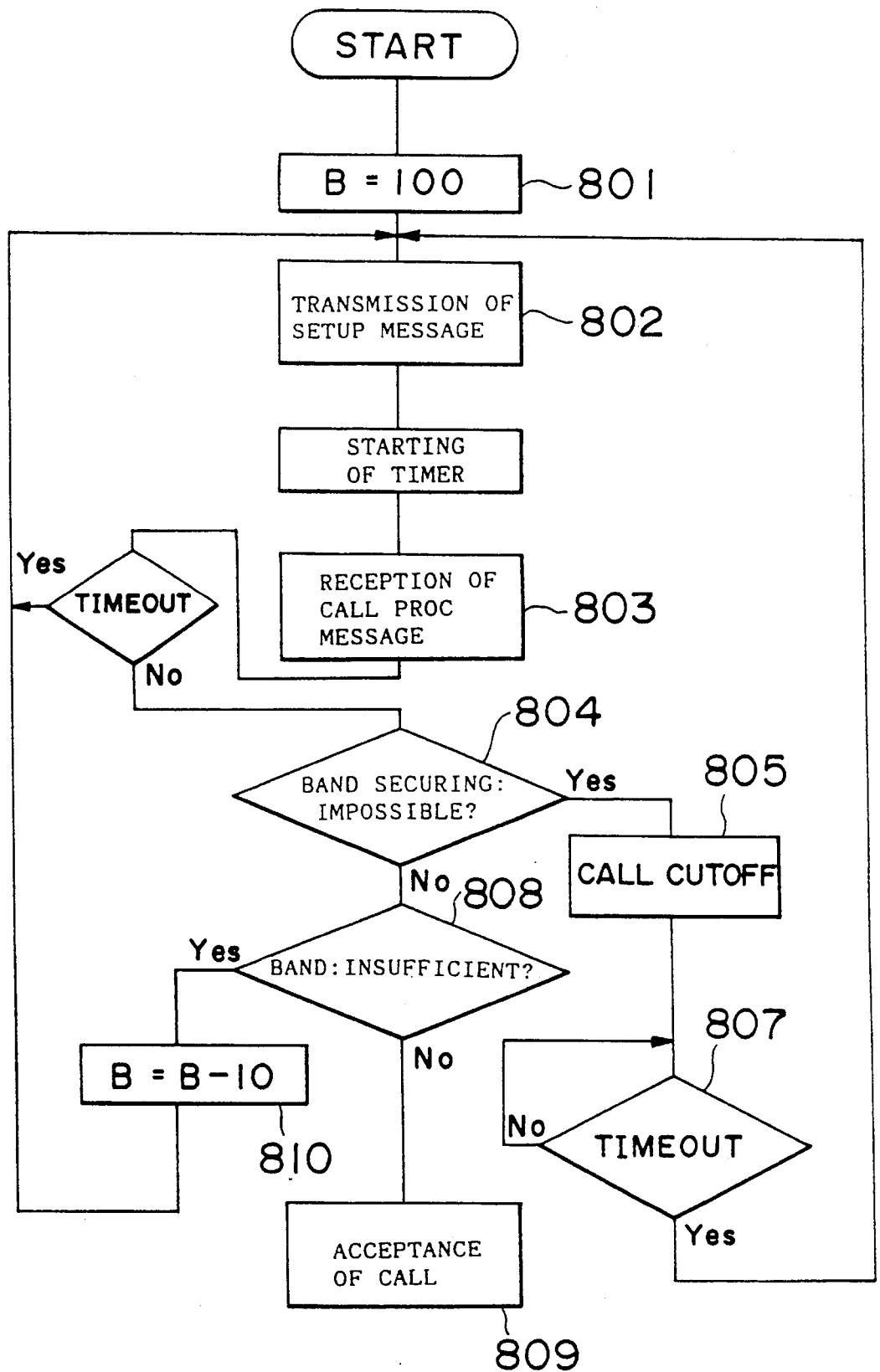
FIG. 17 is a flowchart showing the process procedure in the terminal equipment in the embodiment 3.

FIG. 17 shows a process procedure in a further embodiment according to the present invention.

According to the present embodiment, at first a band value is set (B1=100), then a SETUP message (SETUP) is transmitted (801 and 802), and after a timer 4 is started and a call control message is received (803), it is judged if the securing of a band is impossible or a band is insufficient with a reason indication parameter (804 and 808). In the case when band securing is impossible, similar to the second embodiment, at the time of time-out, a SETUP message is retransmitted and the timer 4 is started (802).

On the other hand, in step 808, if the reason is an insufficient band, similar to the first embodiment, a revised SETUP message is produced in reducing the band value by a certain value, and the revised SETUP message is transmitted (810 and 802).

As described in the above, according to the present embodiment, in the case when a band is impossible to secure or insufficient, a process for dealing with each case can be executed.

Other Embodiments

The embodiment 1 shows that the revised band value B3 is obtained by subtracting a specified value from the initial band value B1 in the case of insufficient band value.

Figure 18:
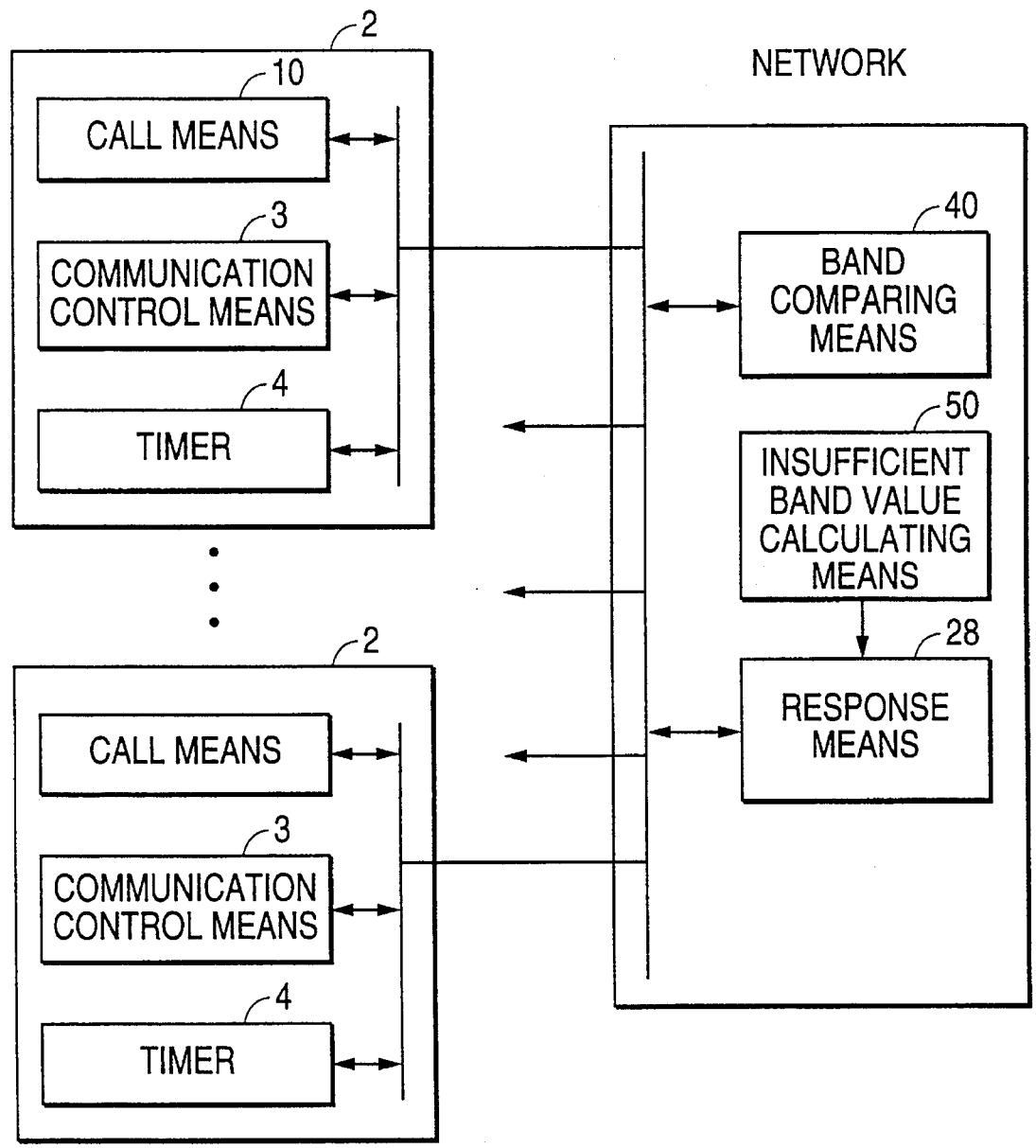
FIG. 18 is a block diagram showing the system with an insufficient band value calculating means.

On the other hand, as shown in FIG. 18, an insufficient band value calculating means 50 can be installed in the switching system. The insufficient band value calculating means obtains an insufficient band value B4 by subtracting the band value B2 from the initial band value B1. The insufficient band value B4 is stored in a call control message and transmitted to the terminal equipment. The terminal equipment 2 obtains a revised band value B3 by subtracting the insufficient band value B4 from the initial band value B1.

The insufficient band value calculating means 50 can be installed in the traffic control portion 27 of the switching system.

In the case of Bi>B2>0. if the band value B1 became B2>B1, transmission will be possible. Therefore the following process permits the transmission.

The information of network band value B2 is registered in the information element of the call control message with the reason indication parameter "#11". The call control message the information is transmitted to the terminal equipment 2 by the response means of the switching system. The terminal equipment obtain new band value B3 based on the information of the network band value B2, for example by subtracting a certain value from the network band value B2.

Figure 19:
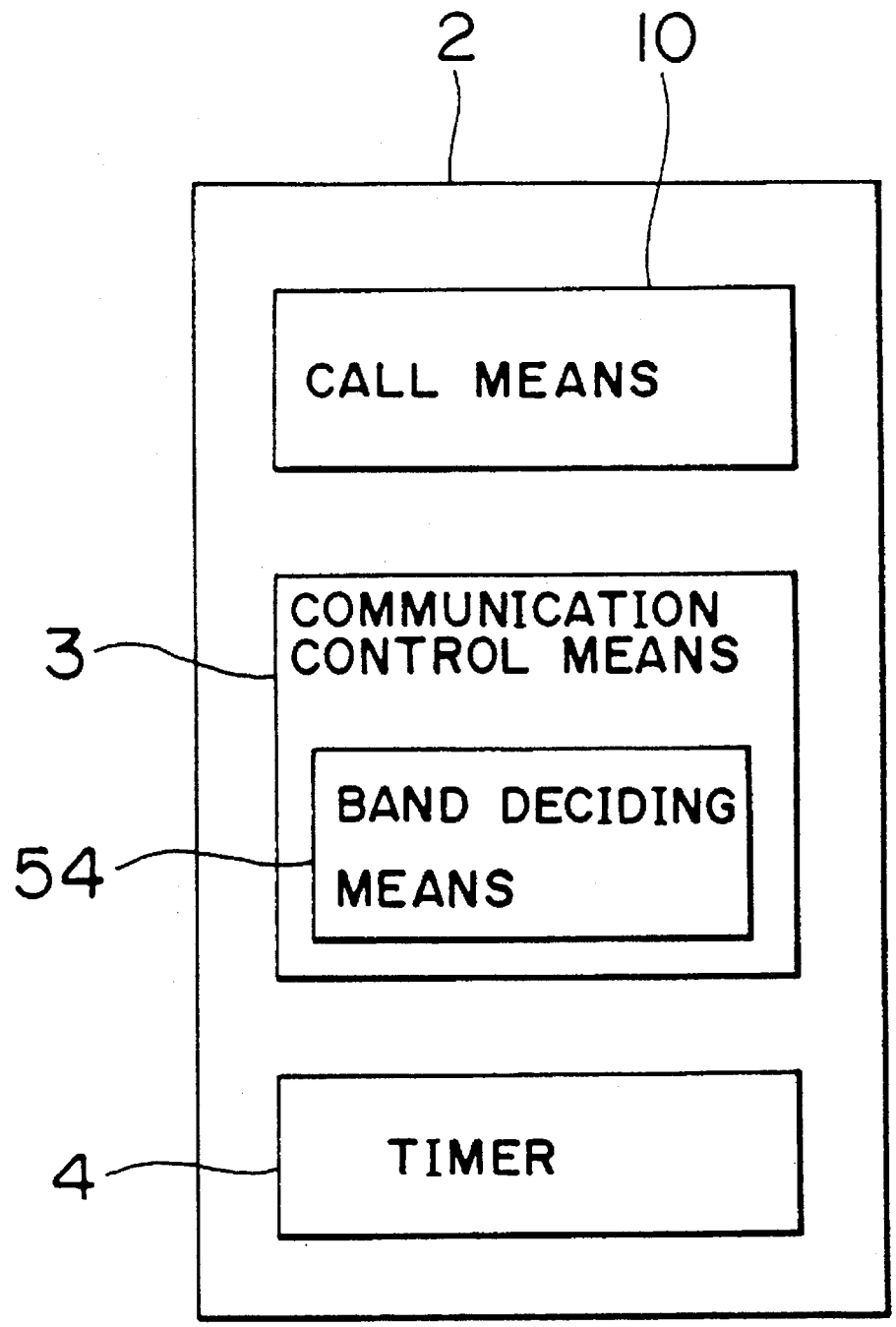
FIG. 19 is a block diagram showing the system with a band value settling means.

The initial band value B1 can be variable according to the kinds of data or amount of data. For example, if the terminal equipment is a TV-telephone, the initial band value B1 is changed corresponding to the state of whether the TV will be used or not, because the amount of the data is small when the TV will not be used. The initial band value B1 is settled by a band value setting means 54. As shown in FIG. 19, the band value settling means 54 is installed in the terminal equipment 2. As the band value settling means 54, there is a means for detecting the kinds or amount of data automatically and determining the value. A band value electing switch or a band value input means operated by manual is also used as the band value setting means 54.

What is claimed is:

1. A band managing method in a communication system having terminal equipment connected to a communication network comprising the steps of:

(a) transmitting a first message including an initial band value B1 to be used by the terminal equipment from the terminal equipment to the network;

(b) comparing the initial band value B1 of the terminal equipment and an available band value B2 of the network;

(c) transmitting a call control message indicating a call setting from the network to the terminal equipment when the result of the comparison is $B1 \leq B2$;

(d) transmitting a call control message indicating no usable band from the network to the terminal equipment and releasing call setting from the network, when the result of the comparison is $B2=0$;

(e) transmitting a call control message indicating lack of usable band from the network to the terminal equipment and releasing call setting from the network, when the result of the comparison is $B1>B2>0$;

(f) cutting off the call when the terminal equipment receives the call control message indicating no band to use; and (g) calculating a revised band value B3 which is less than the available band value B2, transmitting the revised band value B3 as the first message from the terminal equipment to the network.

2. A band managing method according to claim 1, wherein the revised band value B3 is obtained by subtracting a specified value from the initial band value B1.

3. A band managing method according to claim 1, wherein the revised band value B3 is obtained by the steps of:

(a) obtaining an insufficient band value B4 by subtracting the available band value B2 from the initial band value B1;

(b) transmitting the insufficient band value B4 to the terminal equipment; and (c) subtracting the insufficient band value B4 from the initial band value B1 in the terminal equipment.

4. A band managing method according to claim 1, wherein the revised band value B3 is obtained by the steps of:

(a) transmitting the available band value B2 of the network to the terminal equipment in the case of $B1>B2>0$;

(b) subtracting a specified value from the available band value B2 in the terminal equipment.

5. A band managing method according to claim 1, further comprising the steps of:

starting a timer which starts at the time of transmitting the first message including the initial band value B1; and retransmitting the first message including the initial band value B1 when the timer is in a time out state.

6. A band managing system in a communication system having terminal equipment connected to a communication network comprising:

(a) call means for storing an initial band value B1 of the terminal equipment in a first message and transmitting the first message to the network, the network having an available band value B2;

(b) band comparing means for comparing the initial band value B1 of the terminal equipment and the available band value B2 of the network;

(c) response means for transmitting a call control message indicating call setting to the terminal equipment when the result of the comparison is $B1 \leq B2$, transmitting a call control message indicating no band to use to the terminal equipment and releasing call setting from the network, when the result of the comparison is $B2=0$, and transmitting a call control message indicating insufficient band value to use to the terminal equipment and releasing call setting from the network, when the result of the comparison is B1>B2>0; and (d) communication control means for cutting off the call when the terminal equipment receives the call control message indicating no usable band calculating a revised band value B3 which is less than the available band value B2, and transmitting the revised band value B3 as the first message to the network.

7. A band managing system according to claim 6, wherein the communication control means obtains the revised band value B3 by subtracting a specified value from the initial band value B1.

8. A band managing system according to claim 6, further comprising an insufficient band value calculating means for obtaining an insufficient band value B4 by subtracting the available band value B2 from the initial band value B1, and the communication control means obtains the revised band value B3 by subtracting the insufficient band value B4 from the initial band value B1, and transmits the revised band value B3 as the first message to the network.

9. A band managing system according to claim 6, wherein:

the response means transmits the available band value B2 of the network to the terminal equipment in the case of B1>B2>0; and the communication control means obtains the revised band value B3 by subtracting a specified value from the available band value B2 and transmits the revised band value B3 to the network.

10. A band managing system according to claim 6, further comprising a band value setting means for setting a band value to use corresponding to data to be transmitted, the band value set is included in the first message as an initial band value B1.

11. A band managing system according to claim 6, further comprising a timer which starts at the time of transmitting the first message including the initial band value B1; and wherein the communication control means retransmits the first message including the initial band value B1 when the timer is in a time out state.

12. A terminal equipment having an initial band value B1 connected to a communication network having an available band value, the terminal equipment comprising:

(a) call means for storing an initial band value to be used by the terminal equipment in a SETUP message and transmitting the SETUP message to the network; and (b) communication control means for controlling call means, cutting off the call in the case of receiving a call control message from the network indicating no usable band or lack of usable band, wherein the network has released the call, calculating a revised band value B3 which is less than the available band value B2, storing a revised band value B3 in the SETUP message, and transmitting the SETUP message to the network.

13. A terminal equipment according to claim 12, wherein the communication control means obtains the revised band value B3 by subtracting a specified value from the initial band value B1.

14. A terminal equipment according to claim 12, further comprising a timer started by the communication control means at the time of transmitting the SETUP message storing the initial band value B1 and;

the communication control means retransmits the SETUP message storing the initial band value B1 when the timer is in a time out state.

15. A terminal equipment according to claim 12, further comprising a band value setting means for setting a band value to use corresponding data to be transmitted.

16. A switching system in a communication system having a terminal equipment connected to a communication network comprising:

(a) band comparing means for comparing an initial band value B1 of the terminal equipment and an available band value B2 of the network;

(b) response means for transmitting a call control message for a call setting to the terminal equipment when the result of the comparison is B1≦B2, transmitting a call control message indicating no band to use to the terminal equipment and releasing call setting from the network, when the result of the comparison is B2=0, and transmitting a call control message indicating insufficient band value to use to the terminal equipment and releasing call setting from the network, when the result of the comparison is B1>B2>0; and (c) an insufficient band value calculating means for obtaining an insufficient band value B4 by subtracting the available band value B2 from the initial band value B1, and the response means transmits insufficient band value B4 as a control message to the terminal equipment.

17. A switching system according to claim 16, wherein the response means transmits the available band value B2 of the network to the terminal equipment in the case of B1>B2>0.

* * * * *

UNITED STATES PATENT AND TRADEMARK OFFICE
CERTIFICATE OF CORRECTION

PATENT NO. : 5,572,518
DATED : November 5, 1996
INVENTOR(S) : Maki TAKAMA, et al.

It is certified that error appears in the above-indentified patent and that said Letters Patent is hereby corrected as shown below:

In the Drawings:

Figs. 10 and 11, change "caues" to --cause-- (4 occurrences).

Col. 1, line 39, change "off" to --of--.

Col. 4, line 42, change "registerring" to --registering--;
    line 51, change "etc. ." to --etc.--.

Col. 5, line 43, change "rout" to --route--;
    line 63, change "equipment)is" to --equipment) is--.

Col. 7, line 37, change "Bi>B2>0" to --B1>B2>0,--;
    lines 55 and 56, change "settling" to --setting--.

Signed and Sealed this

Fourth Day of March, 1997

Attest:

BRUCE LEHMAN

Attesting Officer

Commissioner of Patents and Trademarks